Oct. 14, 1969  R. L. ARTER  3,472,492
APPARATUS FOR MAKING A FROZEN, AERATED, SOFT CONFECTION
Filed March 4, 1968  2 Sheets-Sheet 1
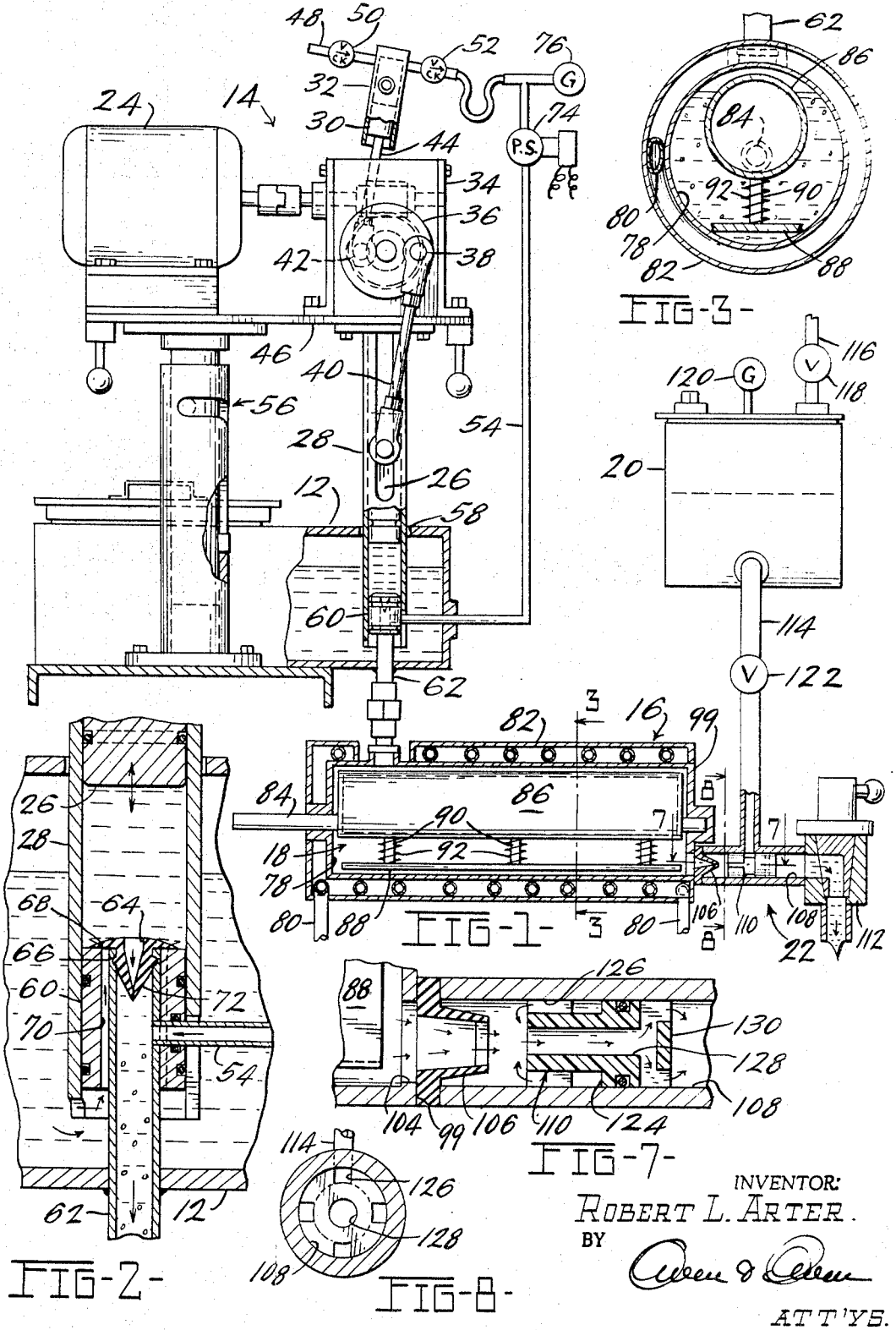
INVENTOR:
ROBERT L. ARTER.
BY
ATT'YS.

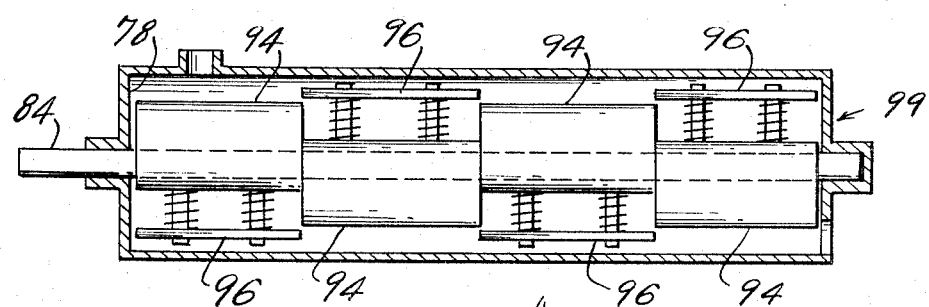
FIG-4-
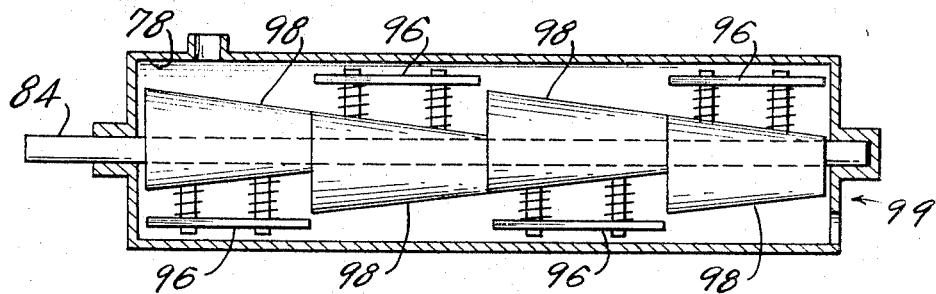
FIG-5-
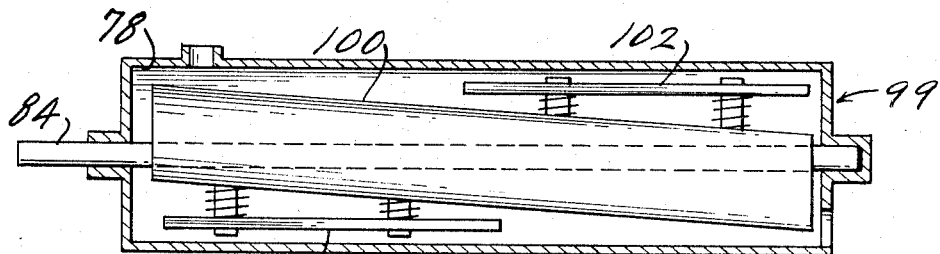
FIG-6-
INVENTOR:
ROBERT L. ARTER.
BY
ATT'YS.

United States Patent Office 3,472,492
Patented Oct. 14, 1969

3,472,492
APPARATUS FOR MAKING A FROZEN, AERATED, SOFT CONFECTION
Robert L. Arter, 1034 Birnam Woods Trail, Indianapolis, Ind. 46280
Filed Mar. 4, 1968, Ser. No. 710,133
Int. Cl. F25c 7/14; B01f 3/04
U.S. Cl. 259—10                             18 Claims

ABSTRACT OF THE DISCLOSURE

Apparatus for manufacturing and dispening a frozen, aerated, soft confection from a neutral liquid mix. Synchronized liquid mix and air pumps aerate the mix to a predetermined overrun and force the aerated mix into a freezing chamber. A pressure switch attached to the output of the air pump controls the two pumps to maintain a predetermined pressure within the freezing chamber. As the aerated mix is frozen, it is agitated by one or more agitators, eccentrically mounted on a rotating shaft in the freezing chamber. A scraper is attached to each agitator and is biased against the interior wall of the chamber. After freezing, the confection flows through a check valve and a series of baffles to a dispensing valve. The neutral confection can be mixed with a flavoring syrup from a pressurized reservoir as it flows through the baffles.

BACKGROUND OF THE INVENTION

This invention relates generally to apparatus for making and dispensing frozen confections, and particularly to apparatus for measuring, freezing and dispensing flavored milk shakes, soft ice cream or frozen custard, slush drinks, or the like.

Numerous machines have been built in the past for manufacturing and dispensing soft frozen confections. The machines generally comprise one or more pumps for liquid mix and air, a freezing chamber having a device for agitating and aerating the mix as it is frozen, and a dispenser. These machines have met with varying degrees of success in attempting to solve the many problems in manufacturing and dispensing frozen confections.

One of the primary problems has been in controlling the overrun of the frozen product, particularly where unskilled personnel operate the machine. As used herein, the term overrun is defined as either the increase in volume of the frozen, aerated mix over a specific volume of unaerated liquid mix, or the decrease in weight of the same volume of aerated frozen mix as compared to liquid mix. If the overrun is small, the frozen product will be too thick; it will not present a pleasing appearance or taste, it will be difficult to dispense, and the cost of the product will be high. On the other hand, if the overrun is too great, the frozen product will be too light, it will not meet with consumer approval, and it may not meet standards established by the state.

There has also been a problem in designing an effective device for agitating the mix as it is frozen. The mix must be thoroughly agitated during freezing for uniform aeration and for preventing settling of the mix. In addition, it is desirable to have the agitator scrape the interior walls of the freezer. If the walls are not scraped, the portion of the mix adjacent the walls will freeze, forming a thermal barrier which will retard freezing of the remainder of the mix. Ice may also form, impairing the quality of the confection. In the prior art, it has been common to have either a scraper which acts secondarily as an agitator or an auger type scraper and agitator or a number of angular beater blades. None of these operates as both an efficient scraper and an efficient agitator.

A third problem has been in dispensing various flavored products from a single freezer. It is customary to have a separate mixing, chilling or freezing, and storage chamber for each different flavor. Considering the fact that each of these chambers must be insulated and contain freezing or chilling means, an agitator, and power means to drive the agitator, providing a plurality of such chambers for a substantial number of flavors involves a substantial capital investment.

There has also been a problem in cleaning the prior machines. As is well known in regard to manufacturing and dispensing food products and especially dairy products, frequent and satisfactory cleansing of the apparatus is essential. Prior machines of this type often contain numerous pumps, chambers and small pipes which are extremely difficult to clean. The parts may be bolted together and, therefore, difficult to disassemble. When cleaning is difficult, personnel using the machine may not do a thorough job.

SUMMARY OF THE INVENTION

Apparatus according to the present invention generally comprises synchronously operated mix and air pumps, a freezing chamber, an agitator, and a flavor mixing dispenser. The mix and air pumps are mounted on opposite sides of a pump motor, with the end of the mix pump extending into a liquid mix reservoir. A two-way check valve is located at the lower end of the mix pump. The check valve prevents liquid mix flow from the mix pump to the mix reservoir and to the mix pump from the freezing chamber, but does not prevent reverse flow. As the mix flows from the mix pump to the freezing chamber, it is aerated with a predetermined amount of air from the air pump.

An adjustable pressure switch is connected to the output of the air pump for controlling the pump motor. When the freezing chamber is filled, the air pressure builds up and opens the switch, shutting off the motor. As the frozen confection is dispensed, the air pressure drops, closing the switch. The pressure switch maintains sufficient pressure in the freezing chamber to force the frozen confection out of the freezing chamber whenever a dispensing valve is opened.

A driven shaft mounted to rotate on the axis of the cylindrical freezing chamber drives an agitator within the chamber. The agitator may take any one of several preferred forms. In one embodiment, a large agitating cylinder is mounted eccentrically to rotate with the drive shaft. A scraper is attached to the agitating cylinder and is biased against the interior wall of the freezing chamber. In a second embodiment, several agitating cylinders are mounted eccentrically on the shaft to rotate with the shaft in a balanced relationship. A scraper is attached to each agitating cylinder and each scraper is biased against the interior wall of the freezing chamber. A third embodiment is similar to the second, except each agitating cylinder is replaced with a truncated cone. In a fourth embodiment, a large agitating cylinder is also mounted eccentrically to rotate with the driven shaft. However, the axis of the agitating cylinder is at an angle to the axis of the driven shaft. Two scrapers are mounted at opposite ends of and on generally opposite sides of the agitating cylinder. Each scraper is biased against the interior wall of the freezing chamber.

For dispensing, the frozen mix flows from the freezing chamber through a check valve into a pipe or conduit. A line connects from a pressurized source of flavoring syrup to the conduit. The syrup and frozen mix flow through baffles, where they are thoroughly mixed, to a dispensing valve. Several similar dispensing valves and conduits can be attached to the end of a single freezing chamber and connected to different flavored syrup reservoirs for dispensing different flavored frozen confections from a single freezer.

The various elements of the apparatus are designed for ease in disassembling, making the apparatus easy to clean.

Accordingly, it is a primary object of the invention to provide an improved apparatus for manufacturing and dispensing frozen, aerated, soft confectionary products.

It is another object of the invention to provide an improved pump for controlling overrun in frozen confectionary products.

Another object of the invention is to provide an improved agitator for a machine for manufacturing frozen confectionary products.

Still another object of the invention is to provide an improved dispenser for mixing a flavoring syrup with a neutral base as it is dispensed.

Another object of the invention is to provide an easy to clean apparatus for manufacturing and dispensing frozen confectionary products.

Other objects and advantages of the invention will become apparent in the following detailed description of preferred forms thereof, reference being had to the accompanying drawings.

BRIEF DESCRIPTION OF THE DRAWINGS

FIG. 1 is a partially cutaway elevational view of apparatus constructed in accordance with the present invention for manufacturing and dispensing frozen confectionary products;

FIG. 2 is an enlarged cutaway view of the mix pump from FIG. 1, showing in detail the two-way check valve;

FIG. 3 is a sectional view taken along the line 3—3 in FIG. 1 and showing the agitator in detail;

FIG. 4 is a sectional view of a freezing chamber and shows a second embodiment of the agitator;

FIG. 5 is a sectional view of a freezing chamber and shows a third embodiment of the agitator;

FIG. 6 is a sectional view of a freezing chamber and shows a fourth embodiment of the agitator;

FIG. 7 is a sectional view taken along the line 7—7 in FIG. 1 and shows the flavor mixing baffle in detail; and FIG. 8 is a sectional view taken along the line 8—8 in FIG. 1 and shows the end of the flavor mixing baffle in detail.

DESCRIPTION OF THE PREFERRED EMBODIMENT

Referring now to FIG. 1, the apparatus for making and dispensing frozen confectionary products is shown in detail. The apparatus generally comprises a liquid mix reservoir 12, a mix and air pumping system 14, a freezer 16 including an agitator 18, a pressurized syrup reservoir 20, and a flavor blending dispenser 22.

The mix and air pumping system 14 includes a motor 24 operatively connected to drive a piston 26 in a mix pump 28 simultaneously with a piston 30 in an air pump 32. The output of the motor 24 is connected through a gear reducer 34, for example, a 20:1 speed reducer, to turn a crank 36 having a journal 38 on one end, which is connected to a connecting rod 40 for driving the piston 26, and a journal 42 on the other end, which is connected to a connecting rod 44 for driving the piston 30. The journals 38 and 40 are on opposite sides of the axis of the crank 36, to balance the load as the crank 36 is rotated.

The motor 24 and the gear reducer 34 are attached to the top of a platform 46 while the mix pump 28 depends from the bottom of the platform 46 below the crank 36. The air pump 32 is mounted above the crank 36 such that the suction strokes and the pump strokes of the mix pump 28 and the air pump 32 are synchronized.

The air pump 32 has an air inlet 48 connected through a check valve 50, through which air can flow from the inlet to the air pump 32 while a reverse flow is prevented. The output of the air pump 32 is connected through a check valve 52 to an air line 54. The check valves 50 and 52 are mounted on the air pump 32. The stroke of the piston 30 is normally adjusted to expel all of the air in the pump 32 at the end of the pump stroke.

The platform 46 is mounted on a telescoping post 56, which, in the raised position, may be rotated to facilitate cleaning both the mix pump 28 and the mix reservoir 12. As the platform is lowered, the mix pump 28 fits through a cooperating hole 58 in the top of the reservoir 12 and sealably engages a head 60 attached to the bottom of the reservoir 12. Referring now to the enlarged view in FIG. 2, the air line 54 is also attached to the head 60. The head 60 is mounted on the end of a pipe 62 which is connected to supply aerated mix to the freezer 16. A flexible two-way check valve 64 made from either rubber or a synthetic resin is inserted in the end of the pipe 62 and is held in place by a ridge 66. As the piston 26 moves upward on the suction stroke, the flexible edge flap 68 of the check valve 64 lifts away from one or more mix passages 70 in the head 60 and the liquid mix flows into the mix pump 28. When the piston 26 starts downward on the pump stroke, the flap 68 seals the passages 70 and the mix in the pump 28 is forced through the flexible flaps 72 in the two-way check valve 64 and into the pipe 62.

As the mix is forced into the supply pipe 62, the air pump simultaneously forces a predetermined amount of air through the air line 54 and into the supply pipe 62 to aerate the mix. The overrun or ratio of air-to-mix supplied to the freezer 16 is determined by the ratio of the displacement of the air pump 32 to the displacement of the mix pump 28. These displacements may be easily varied by changing the distances of one or both of the journals 38 and 42 from the axis of the crank 36.

Referring again to FIG. 1, the aerated mix is forced through the pipe 62 into the freezer 16. When the freezer 16 is filled, the air pressure in the air line 54 builds up, tripping an adjustable pressure switch 74. When the switch 74 is tripped, the motor 24 is de-energized. As the frozen mix is dispensed from the freezer 16, the pressure in the line 54 drops and the switch 74 closes, turning on the motor 24. The pressure at which the switch 74 trips may be varied for different types of products, e.g., a high viscosity product may require a higher pressure than a low viscosity product to force it through the flavor blending dispenser 22. A gauge 76 is provided to indicate the air pressure in the air line 54.

The aerated mix is converted to a frozen, aerated, soft confection in the freezer 16, which includes an inner cylindrical freezing chamber 78. A tube 80, which is wrapped around the outside of the freezing chamber 78, is the evaporator for refrigerant from a refrigeration unit (not shown). An outer insulated jacket 82 increases the efficiency of the freezer 16. The annular space between the jacket 82 and the freezing chamber 78 may be filled with a heat transfer fluid for evenly cooling the freezing chamber 78.

An agitator 18 is mounted to rotate with a shaft 84 which lies along the axis of the cylindrical freezing chamber 78 and extends through one end of the freezer 16. A motor (not shown) turns the shaft 84 to drive the agitator 18 at a desired speed. In the embodiment shown in FIGS. 1 and 3, the agitator generally comprises a large agitating cylinder 86 and a scraper 88. The agitating cylinder 86 is eccentrically mounted on the shaft 84 to rotate with the shaft. The agitating cylinder 86 preferably has a diameter on the order of, or larger than, the radius of the cylindrical freezing chamber 78. However, the agitating cylinder 86 is mounted on the shaft 84 such that it is spaced from the interior wall of the freezing chamber 78. Although the agitating cylinder is shown in FIG. 3 with a circular cross section, it may take other forms such as triangular or square. A number of guides 90 are mounted on the side of the cylinder 86 nearest the shaft 84. The scraper 88 comprises a flat piece of metal having sharp, parallel edges and is slidably mounted on the guides 90. A spring 92 mounted around each guide 90 biases the scraper 88 against the smooth interior wall of the freezing chamber 78. As the large agitating cylinder 86 is rotated by the shaft 84, the mix flows around it and, through cavitation, the mix is thoroughly agitated and aerated. The scraper 88, which is also rotated by the shaft 84, prevents the mix from hardening or freezing on the interior wall of the freezing chamber 78.

Three additional embodiments of the agitator 18 are shown in FIGS. 4–6. In FIG. 4, a number of short agitating cylinders 94 are eccentrically mounted to rotate with the shaft 84. The cylinders 94 are preferably mounted on the shaft 84 in a balanced relationship to reduce vibration as they are rotated by the shaft 84. A scraper 96 is attached to each agitating cylinder 94 and is biased against the smooth interior wall of the freezing chamber 78 in a manner similar to that described for the scraper 88 in FIG. 1. The agitator embodiment shown in FIG. 5 is similar to that shown in FIG. 4, with the exception that the agitating cylinders 94 are replaced with a number of truncated cones 98 which are also eccentrically mounted to rotate with the shaft 84 in a balanced relationship. This embodiment has an advantage in that the conical agitators 98 force the frozen mix towards the dispensing end 99 of the freezing chamber 78. This, in combination with gravity, is sufficient to feed the frozen mix to the dispenser 22. A final embodiment of the agitator 18 is shown in FIG. 6. As with the embodiment in FIG. 1, a single elongated agitating cylinder 100 is eccentrically mounted to rotate with the shaft 84. However, here the agitating cylinder 100 is mounted in a position where its axis forms an angle to the axis of the shaft 84. If the axis of the cylinder 100 intersects the axis of the shaft 84, the rotating cylinder 100 describes two truncated cones of revolution; while if the axes do not intersect, the rotating cylinder 100 describes a hyperboloid. Two scrapers 102 are attached to the agitating cylinder 100 in the manner previously described and are biased to scrape against the smooth interior wall of the freezing chamber 78.

Referring now to FIGS. 1, 7 and 8, the flavor blending dispenser 22 is shown in detail. An outlet 104 is provided at the lower corner of the dispensing end 99 of the freezing chamber 78. The frozen neutral mix flows, through gravity and the high pressure within the freezing chamber 78, through the outlet 104 into the dispenser 22. The dispenser 22 generally comprises a check valve 106, a conduit 108, a mixing baffle 110 and a dispensing valve 112. When the dispensing valve 112 is opened by the machine operator, the frozen mix flows from the freeznig chamber 78 through the check valve 106, through the conduit 108 and the baffle 110, and through the dispensing valve 112. A syrup supply line 114 joins the pressurized syrup reservoir 20 with the conduit 108. A high pressure carbon dioxide tank (not shown) is connected through a hose 116 and a control valve 118 to the syrup reservoir 20 for maintaining a predetermined pressure within the reservoir 20. The reservoir pressure is indicated on a gauge 120. A valve 122 in the syrup supply line 114 meters the flow of the syrup down to a constant stream of right proportion to the neutral frozen mix flowing through the conduit 108. It is usually desirable to have the syrup enter the conduit 108 at a pressure significantly higher than the pressure of the frozen mix, e.g., a syrup pressure of 50 p.s.i.g. and a mix pressure of 30 p.s.i.g. When the dispensing valve 112 is closed, the check valve 106 prevents any possible flow of the high pressure syrup into the freezing chamber 78.

The baffle 110 is shaped to form an annular syrup chamber 124 between the exterior of the baffle 110 and the interior wall of the conduit 108. The syrup supply line 114 is connected to discharge syrup into the annular chamber 124. A number of passages 126 in the baffle 110 direct the syrup in high velocity streams from the annular chamber 124 in a direction against the flow of the frozen mix in the conduit 108. The collision between the flow of the frozen mix and the high velocity streams of syrup disperses the syrup into the frozen mix. The mixture of syrup and frozen mix then flows through a central passage 128 in the baffle 110, against a mixing deflector 130, and is dispensed through the dispensing valve 112.

As has been previously stated, a number of dispensers may be attached to the end of a single freezer 16 for dispensing different flavored products. If the apparatus is used to manufacture a vanilla or neutral frozen custard, one dispenser may simply comprise a hollow conduit and a dispensing valve. This dispenser is used for dispensing frozen custard for cones, sundaes, and the like. One or more flavor dispensers may also be connected to the freezer. These dispensers can be adjusted to add sufficient flavoring syrup to produce milk shakes. With this arrangement, a number of individual freezers may be replaced by a single freezer.

What I claim is:

1. Apparatus for manufacturing and dispensing a frozen, aerated, soft confection from a liquid mix, comprising, in combination: a freezing chamber; means for cooling said freezing chamber; a reservoir for storing a liquid mix; a mix pump for forcing such mix from said reservoir to said chamber, said mix pump having a predetermined displacement; a flexible two-way check valve, said check valve being operable to prevent a flow of mix from said chamber to said mix pump and from said mix pump to said reservoir but inoperable to prevent a flow of mix from said reservoir to said mix pump and from said mix pump to said chamber; an air pump for aerating such mix as it is forced by said mix pump to said chamber, the displacement of said air pump being predetermined to give the aerated mix a desired overrun; means for simultaneously driving said mix pump and said air pump; pressure operated switch means attached to the output of said air pump for controlling said driving means to maintain a predetermined pressure in said freezing chamber; means in said freezing chamber for agitating such aerated mix as it is frozen; and dispensing means attached to said freezing chamber for dispensing aerated mix when frozen into a confection.

2. The apparatus for manufacturing and dispensing a frozen, aerated, soft confection of claim 1, wherein said means for simultaneously driving said mix pump and said air pump comprises: a motor; a crank driven by said motor, said crank having two opposed journals; two opposed connecting rods, one of said connecting rods being attached between one of said journals and said mix pump, the other of said connecting rods being attached between the other of said journals and said air pump.

3. The apparatus for manufacturing and dispensing a frozen, aerated, soft confection of claim 1, wherein said freezing chamber is cylindrically shaped and said agitating means comprises a rotatable shaft mounted along the axis of said cylindrical chamber, means for rotating said shaft, a cylindrical agitator eccentrically mounted to rotate with said shaft, a scraper attached to said cylindrical agitator, and means for biasing said scraper against the interior wall of said cylindrical chamber.

4. The apparatus for manufacturing and dispensing a frozen, aerated, soft confection of claim 3, wherein the diameter of said cylindrical agitator is at least as large as the radius of said cylindrical chamber, and wherein said cylindrical agitator is spaced from the interior wall of said cylindrical chamber.

5. The apparatus for manufacturing and dispensing a frozen, aerated, soft confection of claim 1, wherein said freezing chamber is cylindrically shaped, and said agitating means comprises a rotatable shaft mounted along the axis of said cylindrical chamber, means for rotating said shaft, plural cylindrical agitators, said plural cylindrical agitators being eccentrically mounted to rotate with said shaft in a balanced relationship, plural scrapers, each of said scrapers being attached to a different one of said cylindrical agitators, and means for biasing each of said scrapers against the interior wall of said cylindrical chamber.

6. The apparatus for manufacturing and dispensing a frozen, aerated, soft confection of claim 1, wherein said freezing chamber is cylindrically shaped, and said agitating means comprises a rotatable shaft mounted along the axis of said cylindrical chamber, means for rotating said shaft, at least two truncated conical agitators, said agitators being eccentrically mounted to rotate with said shaft in a balanced relationship, at least two scrapers, each of said scrapers being attached to a different one of said agitators, and means for biasing each of said scrapers against the interior wall of said cylindrical chamber.

7. The apparatus for manufacturing and dispensing a frozen, aerated, soft confection of claim 1, wherein said freezing chamber is cylindrically shaped, and said agitating means comprises a rotatable shaft mounted along the axis of said cylindrical chamber, means for rotating said shaft, a cylindrical agitator, said cylindrical agitator being eccentrically mounted to rotate with said shaft, the axis of said cylindrical agitator being at an angle to the axis of said shaft, at least two scrapers, said scrapers being attached to said cylindrical agitator, means for biasing each of said scrapers against the interior wall of said cylindrical chamber.

8. The apparatus for manufacturing and dispensing a frozen, aerated, soft confection of claim 7, wherein the diameter of said cylindrical agitator is at least as large as the radius of said cylindrical chamber.

9. The apparatus for manufacturing and dispensing a frozen, aerated, soft confection of claim 1, wherein said dispensing means comprises a conduit having one end attached to one end of said cylindrical freezing chamber, a check valve effective to prevent a flow from said conduit to said freezing chamber and ineffective to prevent a reverse flow, a reservoir for storing a flavoring syrup under pressure, means operatively connecting said syrup reservoir to said conduit, baffle means in said conduit for mixing a flow of syrup from said syrup reservoir with a flow of frozen aerated mix from said freezing chamber, and a dispensing valve attached to the end of said conduit opposite that attached to said chamber for controlling the flow of mixed syrup and frozen aerated mix.

10. In a freezer for manufacturing a frozen, aerated, soft confection from an aerated mix, said freezer having a cylindrical freezing chamber, an improved agitator, comprising, in combination: a rotatable shaft mounted along the axis of said cylindrical chamber, means for rotating said shaft, a cylindrical agitator eccentrically mounted to rotate with said shaft, a scraper attached to said cylindrical agitator, and means for biasing said scraper against the interior wall of said cylindrical chamber.

11. The improved agitator of claim 10 wherein the diameter of said cylindrical agitator is at least as large as the radius of said cylindrical chamber, and wherein said cylindrical agitator is spaced from the interior wall of said cylindrical chamber.

12. In a freezer for manufacturing a frozen, aerated, soft confection from an aerated mix, said freezer having a cylindrical freezing chamber, an improved agitator, comprising, in combination: a rotatable shaft mounted along the axis of said cylindrical chamber, means for rotating said shaft, plural cylindrical agitators, said plural cylindrical agitators being eccentrically mounted to rotate with said shaft in a balanced relationship, plural scrapers, each of said scrapers being attached to a different one of said cylindrical agitators, and means for biasing each of said scrapers against the interior wall of said cylindrical chamber.

13. In a freezer for manufacturing a frozen, aerated, soft confection from an aerated mix, said freezer having a cylindrical freezing chamber, an improved agitator, comprising, in combination: a rotatable shaft mounted along the axis of said cylindrical chamber, means for rotating said shaft, at least two truncated conical agitators, said conical agitators being eccentrically mounted to rotate with said shaft in a balanced relationship, at least two scrapers, each of said scrapers being attached to a different one of said conical agitators, and means for biasing each of said scrapers against the interior wall of said cylindrical chamber.

14. In a freezer for manufacturing a frozen, aerated, soft confection from an aerated mix, said freezer having a cylindrical freezing chamber, an improved agitator, comprising, in combination: a rotatable shaft mounted along the axis of said cylindrical chamber, means for rotating said shaft, a cylindrical agitator, said cylindrical agitator being eccentrically mounted to rotate with said shaft, the axis of said cylindrical agitator being at an angle to the axis of said shaft, at least two scrapers, said scrapers being attached to said cylindrical agitator, and means for biasing each of said scrapers against the interior wall of said cylindrical chamber.

15. The improved agitator of claim 14, wherein the diameter of said cylindrical agitator is at least as large as the radius of said cylindrical chamber.

16. In a freezer for manufacturing and dispensing a flavored product, a dispenser for mixing a flavoring syrup with a cold neutral base as it is dispensed, comprising: a conduit having one end connected to receive neutral base from the freezer, a check valve operable to prevent such base to flow from said conduit to the freezer and inoperable to prevent a reverse flow, a reservoir for storing a flavoring syrup under pressure, means operatively connecting said syrup reservoir to said conduit, baffle means in said conduit for mixing a flow of syrup from said syrup reservoir with a flow of neutral base from the freezer, and a dispensing valve attached to the end of said conduit opposite that end attached to the freezer for controlling the flow of mixed syrup and neutral base.

17. The dispenser of claim 16, wherein said means operatively connecting said syrup reservoir to said conduit includes a valve means for metering the syrup flow.

18. The dispenser of claim 16, wherein said baffle is so shaped as to form an annular syrup chamber between its exterior and the interior of said conduit, said syrup reservoir is connected through said operatively connecting means to said annular chamber, and wherein said baffle means defines plural passages for dispersing syrup from said annular chamber into a flow of neutral base from the freezer.

References Cited
UNITED STATES PATENTS

| | | |
|---|---|---|
| 1,973,190 | 9/1934 | Westfield. |
| 2,736,534 | 2/1956 | Atkins. |
| 2,758,823 | 8/1956 | Vasby. |
| 2,774,314 | 12/1956 | Moser. |
| 3,317,198 | 5/1967 | Phelan. |

ROBERT W. JENKINS, Primary Examiner

U.S. Cl. X.R.

107—1